US011599126B2

(12) United States Patent
Ceparu et al.

(10) Patent No.: US 11,599,126 B2
(45) Date of Patent: Mar. 7, 2023

(54) METHOD AND SYSTEM FOR PROVIDING FLIGHT GUIDANCE FOR AN AIRCRAFT

(71) Applicant: Airbus Canada Managing GP Inc., Quebec (CA)

(72) Inventors: Silviu Ceparu, Quebec (CA); James P. Dwyer, Wichita, KS (US); Nadiya Mannan, Quebec (CA)

(73) Assignee: AIRBUS CANADA MANAGING GP INC., Mirabel (CA)

( * ) Notice: Subject to any disclaimer, the term of this patent is extended or adjusted under 35 U.S.C. 154(b) by 227 days.

(21) Appl. No.: 16/962,358

(22) PCT Filed: Jan. 16, 2019

(86) PCT No.: PCT/CA2019/050059
§ 371 (c)(1),
(2) Date: Jul. 15, 2020

(87) PCT Pub. No.: WO2019/140522
PCT Pub. Date: Jul. 25, 2019

(65) Prior Publication Data
US 2020/0348694 A1    Nov. 5, 2020

Related U.S. Application Data

(60) Provisional application No. 62/618,186, filed on Jan. 17, 2018.

(51) Int. Cl.
*G05D 1/04* (2006.01)
*B64F 5/60* (2017.01)

(52) U.S. Cl.
CPC .............. *G05D 1/042* (2013.01); *B64F 5/60* (2017.01)

(58) Field of Classification Search
CPC ........ G05D 1/042; G05D 1/0072; B64F 5/60; B64C 13/18
See application file for complete search history.

(56) References Cited

U.S. PATENT DOCUMENTS

2007/0222665 A1* 9/2007 Koeneman ........... G08G 5/0078
340/961
2014/0343761 A1* 11/2014 Pastor ..................... B64C 13/18
701/7

(Continued)

FOREIGN PATENT DOCUMENTS

CA    2784729 C    6/2011
DE    102016110863 A1 * 12/2017 ............. B64C 13/18

(Continued)

OTHER PUBLICATIONS

International Search Report; priority document, dated Mar. 28, 2019.

*Primary Examiner* — Mary Cheung
(74) *Attorney, Agent, or Firm* — Greer, Burns & Crain, Ltd.

(57) ABSTRACT

Methods and systems for providing vertical flight guidance for an aircraft. Vertical flight guidance for the aircraft is provided by an aircraft computer in an altitude capture mode for commanding the aircraft to capture a target altitude. At least one engine inoperative condition is detected by the computer, while in the altitude capture mode. In response to detecting the at least one engine inoperative condition, the computer causes an automatic transition (e.g., no pilot action on a flight level change (FLC) pushbutton on a flight control panel) of the vertical flight guidance for the aircraft from the altitude capture mode to an already existing mode that is flight level change with modified control parameters and provides vertical flight guidance in the flight level change mode for commanding the aircraft to capture the target (Continued)

altitude while maintaining airspeed of the aircraft substantially at a target airspeed.

20 Claims, 4 Drawing Sheets

(56) References Cited

U.S. PATENT DOCUMENTS

| | | | | |
|---|---|---|---|---|
| 2016/0063867 A1* | 3/2016 | Zammit | ................. | G08G 5/025 |
| | | | | 701/18 |
| 2016/0123763 A1* | 5/2016 | Wischmeyer | ....... | G06F 3/04842 |
| | | | | 701/14 |
| 2017/0013061 A1 | 1/2017 | Coulmeau et al. | | |

FOREIGN PATENT DOCUMENTS

| | | | | | |
|---|---|---|---|---|---|
| FR | 3036506 | A1 | * | 11/2016 | ............. B64C 13/18 |
| JP | 2004017743 | A | * | 1/2004 | |
| WO | WO-2011078847 | A1 | * | 6/2011 | ........... G05D 1/0072 |

\* cited by examiner

METHOD AND SYSTEM FOR PROVIDING FLIGHT GUIDANCE FOR AN AIRCRAFT

CROSS-REFERENCES TO RELATED APPLICATIONS

This application claims the benefit of the International Application No. PCT/CA2019/050059, filed on Jan. 16, 2019, and of U.S. provisional Application Ser. No. 62/618,186, filed on Jan. 17, 2018, the entire disclosures of which are incorporated herein by way of reference.

FIELD OF THE INVENTION

The present disclosure relates generally to aircraft guidance, and more specifically to providing vertical flight guidance for an aircraft to achieve airspeed protection.

BACKGROUND OF THE INVENTION

After liftoff of an aircraft with high rate of climb (RoC) and low setting of the preselected altitude, a flight guidance system switches early (i.e., far from the target altitude) from a takeoff mode to an altitude capture (ALT CAP) mode to achieve a target altitude. In the altitude capture mode, airspeed of the aircraft is controlled by thrust command provided by an automatic throttle or a manual throttle. If a single engine failure (OEI) occurs in the altitude capture mode, the airspeed of the aircraft can no longer be controlled on thrust (i.e., automatically or manually) because thrust is saturated at a maximum when the single engine failure occurs. If the OEI occurs right after the ALT CAP mode became active compounded with the aircraft being far from the target altitude (e.g., early ALT CAP activation due to high rate of climb) without pilot intervention to change the aircraft pitch attitude (i.e. pitch down), the airspeed decays below safe operating values (e.g., V2 in takeoff). A similar scenario may occur while preforming go-around maneuvers.

However, pilot intervention is not an acceptable solution at least on platforms with a high level of integration of the Automatic Flight Control System (AFCS). The low altitude capture with OEI is a critical phase of flight (i.e., takeoff or go-around) and is a high crew workload/stress operational scenario. Moreover, on integrated AFCS (e.g., as the case of C Series and Global 7000 aircraft), manual intervention would require the crew to ignore the flight director (FD) vertical guidance (i.e. referenced to target altitude). Such situation has been deemed unacceptable by the authorities (e.g., Transport Canada Civil Aviation (TCCA), European Aviation Safety Agency (EASA) and Federal Aviation Administration (FAA)). The FD lateral and vertical guidance may be integrated (e.g., by a single FD cue), thus the FD guidance cannot be deselected (e.g., FD OFF) because the crew needs the FD lateral guidance while they need to ignore the vertical guidance.

Thus, there is a need to provide flight guidance to prevent airspeed decay below safe operating values during take-off and go-around maneuvers when a single engine failure occurs while in ALT CAP vertical guidance mode.

SUMMARY OF THE INVENTION

The present disclosure provides methods and systems for providing vertical flight guidance for an aircraft. The methods and systems described herein provide airspeed protection during take-off and/or go-around maneuvers following an engine failure while an altitude capture (ALT CAP) vertical guidance mode is active. The methods and systems described herein provide flight guidance capable to automatically pitch down the aircraft in order to prevent airspeed decay below safe operating values during take-off (e.g., takeoff safety speed) and/or go-around maneuvers (e.g., missed approach climb speed) when a single engine failure occurs while in the ALT CAP vertical guidance mode.

In accordance with a broad aspect, there is provided a computer-implemented method for providing vertical flight guidance for an aircraft. The method comprises providing, by a computer, vertical flight guidance for the aircraft in an altitude capture mode for commanding the aircraft to capture a target altitude. The method comprises detecting, by the computer, at least one engine inoperative condition while in the altitude capture mode. The method comprises, in response to detecting the at least one engine inoperative condition, the computer transitioning the vertical flight guidance for the aircraft from the altitude capture mode to a flight level change mode and providing vertical flight guidance in the flight level change mode for commanding the aircraft to capture the target altitude while maintaining airspeed of the aircraft substantially at a target airspeed.

In some embodiments, detecting the at least one engine inoperative condition comprises detecting the at least one engine inoperative condition at takeoff.

In some embodiments, the target airspeed is a takeoff safety speed of the aircraft.

In some embodiments, the target airspeed is a takeoff safety speed of the aircraft plus a predetermined value.

In some embodiments, detecting the at least one engine inoperative condition comprises detecting the at least one engine inoperative condition at a time of a go-around maneuver.

In some embodiments, providing vertical flight guidance in the flight level change mode comprises maintaining airspeed of the aircraft substantially at a go-around speed of the aircraft with one engine inoperative.

In some embodiments, detecting the at least one engine inoperative condition comprises detecting the at least one engine inoperative condition when airspeed of the aircraft is below an airspeed threshold.

In some embodiments, the flight level change mode is a second flight level change mode having a higher vertical acceleration limit than a vertical acceleration limit of a first flight level change mode and a lower minimum vertical speed level than a minimum vertical speed level of the first flight level change mode; and wherein the method further comprises transitioning, by the computer, the second flight level change mode to the first flight level change mode when airspeed is above the airspeed threshold.

In some embodiments, the airspeed threshold is a takeoff safety speed of the aircraft.

In some embodiments, the airspeed threshold is a missed approach climb speed of the aircraft with one engine inoperative.

In some embodiments, detecting the at least one engine inoperative condition comprises detecting the at least one engine inoperative condition when complemented deceleration of the aircraft drops below a deceleration threshold.

In some embodiments, the flight level change mode is a second flight level change mode having a higher vertical acceleration limit than a vertical acceleration limit of a first flight level change mode and a lower minimum vertical speed level than a minimum vertical speed level of the first flight level change mode; and wherein the method further comprises transitioning, by the computer, the second flight level change mode to the first flight level change mode when complemented deceleration is above the deceleration threshold.

In some embodiments, the deceleration threshold is 1.18 kts/s.

In some embodiments, the method further comprises transitioning, by the computer, the first flight level change mode to the second flight level change mode when complementary filtered airspeed of the aircraft is below a takeoff safety speed minus 3 knots, aircraft altitude is below a reference altitude by a set altitude amount, and aircraft altitude is below the target altitude.

In some embodiments, the method further comprises transitioning, by the computer, the first flight level change mode to the second flight level change mode when complementary filtered airspeed of the aircraft is below a missed approach climb speed minus 3 knots, aircraft altitude is below a reference altitude by a set altitude amount, and aircraft altitude is below the target altitude.

In some embodiments, wherein providing vertical flight guidance in the second flight level change mode comprises: providing vertical flight guidance for commanding the aircraft to maintain a vertical speed of the aircraft above 100 ft/min; and providing vertical flight guidance for commanding the aircraft to limit a vertical acceleration of the aircraft below 0.4 G.

In some embodiments, providing vertical flight guidance comprises providing visual cues on a display device for a pilot to control the aircraft.

In some embodiments, providing vertical flight guidance comprises providing commands to an autopilot computer for controlling the aircraft.

In accordance with another broad aspect, there is provided system for providing vertical flight guidance for an aircraft. The system comprises a processing unit and a non-transitory computer-readable memory having stored thereon program instructions executable by the processing unit. The program instructions are executable by the processing unit for: providing vertical flight guidance for the aircraft in an altitude capture mode for commanding the aircraft to capture a target altitude; detecting at least one engine inoperative condition while in the altitude capture mode; and in response to detecting the at least one engine inoperative condition, transitioning the vertical flight guidance for the aircraft from the altitude capture mode to a flight level change mode and providing vertical flight guidance in the flight level change mode for commanding the aircraft to capture the target altitude while maintaining airspeed of the aircraft substantially at a target airspeed.

In some embodiments, detecting the at least one engine inoperative condition comprises detecting the at least one engine inoperative condition at takeoff.

In some embodiments, the target airspeed is a takeoff safety speed of the aircraft.

In some embodiments, the target airspeed is a takeoff safety speed of the aircraft plus a predetermined value.

In some embodiments, detecting the at least one engine inoperative condition comprises detecting the at least one engine inoperative condition at a time of a go-around maneuver.

In some embodiments, providing vertical flight guidance in the flight level change mode comprises maintaining airspeed of the aircraft substantially at a go-around speed of the aircraft with one engine inoperative.

In some embodiments, detecting the at least one engine inoperative condition comprises detecting the at least one engine inoperative condition when airspeed of the aircraft is below an airspeed threshold.

In some embodiments, the flight level change mode is a second flight level change mode having a higher vertical acceleration limit than a vertical acceleration limit of a first flight level change mode and a lower minimum vertical speed level than a minimum vertical speed level of the first flight level change mode; and wherein the program instructions are further executable by the processing unit for transitioning the second flight level change mode to the first flight level change mode when airspeed is above the airspeed threshold.

In some embodiments, the airspeed threshold is a takeoff safety speed of the aircraft.

In some embodiments, the airspeed threshold is a missed approach climb speed of the aircraft with one engine inoperative.

In some embodiments, detecting the at least one engine inoperative condition comprises detecting the at least one engine inoperative condition when complemented deceleration of the aircraft drops below a deceleration threshold.

In some embodiments, the flight level change mode is a second flight level change mode having a higher vertical acceleration limit than a vertical acceleration limit of a first flight level change mode and a lower minimum vertical speed level than a minimum vertical speed level of the first flight level change mode; and wherein the program instructions are further executable by the processing unit for transitioning the second flight level change mode to the first flight level change mode when complemented deceleration is above the deceleration threshold.

In some embodiments, the deceleration threshold is 1.18 kts/s.

In some embodiments, the program instructions are further executable by the processing unit for transitioning the first flight level change mode to the second flight level change mode when complementary filtered airspeed of the aircraft is below a takeoff safety speed minus 3 knots, aircraft altitude is below a reference altitude by a set altitude amount, and aircraft altitude is below the target altitude.

In some embodiments, the program instructions are further executable by the processing unit for transitioning the first flight level change mode to the second flight level change mode when complementary filtered airspeed of the aircraft is below a missed approach climb speed minus 3 knots, aircraft altitude is below a reference altitude by a set altitude amount, and aircraft altitude is below the target altitude.

In some embodiments, providing vertical flight guidance in the second flight level change mode comprises: providing vertical flight guidance for commanding the aircraft to maintain a vertical speed of the aircraft above 100 ft/min; and providing vertical flight guidance for commanding the aircraft to limit a vertical acceleration of the aircraft below 0.4 G.

In some embodiments, providing vertical flight guidance comprises providing visual cues on a display device for a pilot to control the aircraft.

In some embodiments, providing vertical flight guidance comprises providing commands to an autopilot computer for controlling the aircraft.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Methods and systems for providing vertical flight guidance for an aircraft are described herein. The methods and systems described herein provide airspeed protection during take-off and/or go-around maneuvers following an engine failure while an altitude capture (ALT CAP) vertical guidance mode is active. The methods and systems described herein provide flight guidance capable to automatically pitch down the aircraft in order to prevent airspeed decay below safe operating values during take-off (e.g., takeoff safety speed) and/or go-around maneuvers (e.g., missed approach climb speed) when a single engine failure occurs while in the ALT CAP vertical guidance mode.

Figure 1:
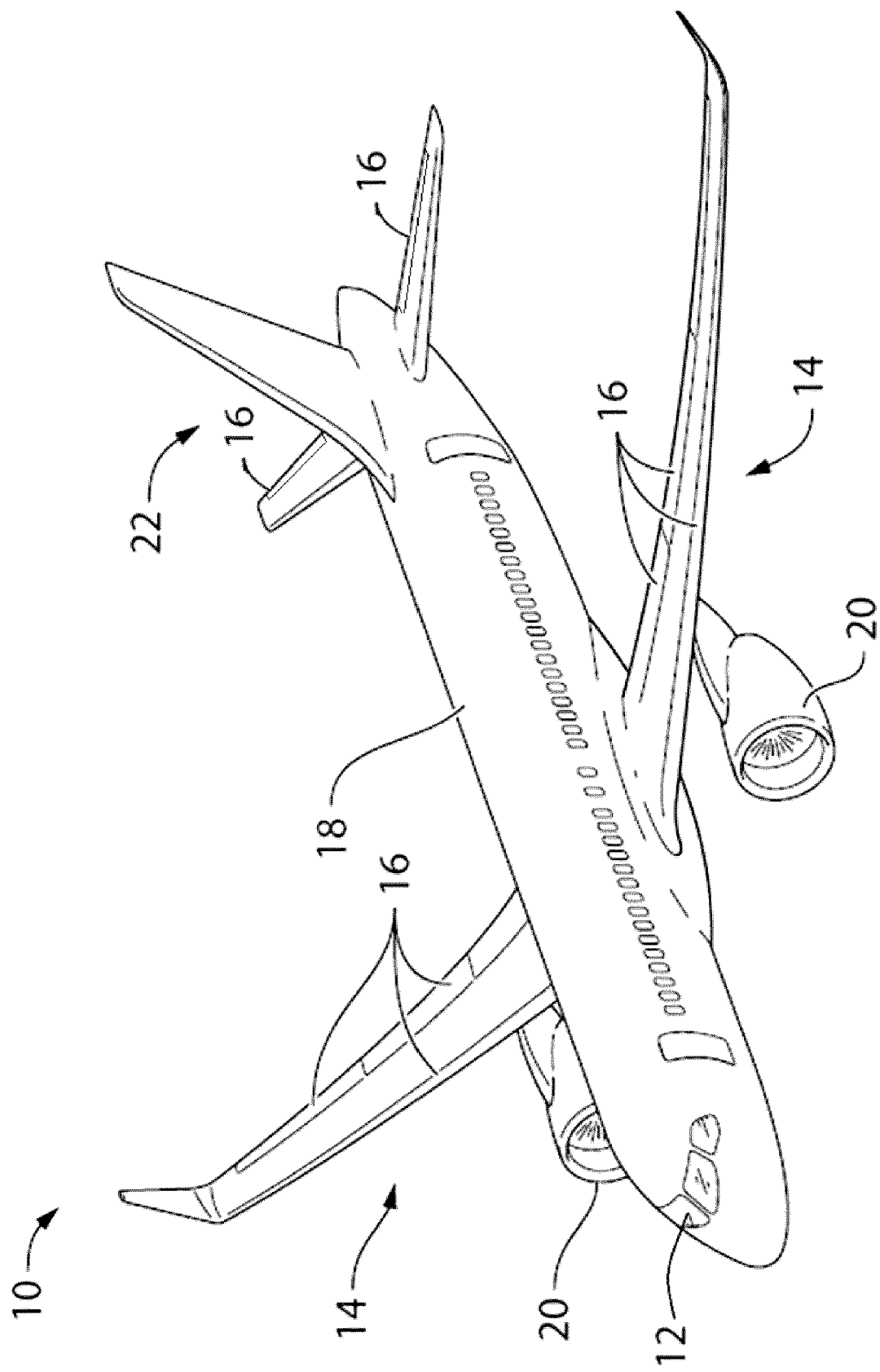
FIG. 1 is a diagram of an example aircraft.

With reference to FIG. 1, an exemplary aircraft 10 is shown. The aircraft 10 may be any type of aircraft such as a propeller plane, jet plane, turbojet plane, turbo-propeller plane, and the like. For example, the aircraft 10 may be a narrow-body, twin-engine jet airliner. The aircraft 10 may be a fixed-wing aircraft. The aircraft 10 may comprise flight control components 16, wings 31, 32, fuselage 18, engines 20 and empennage 22 of known or other type. The flight control components 16 may comprise ailerons, elevators, and a rudder. In the embodiment illustrated, a single engine 20 is mounted under each of the wings 31, 32. However, two or more engines 20 may be mounted to one or more of wings 31, 32. Alternatively, or in addition, one or more engines 20 may be mounted to fuselage 18 or be installed on the aircraft 10 in any suitable manner A cockpit 12 may be positioned at any suitable location on the aircraft 10, for example at a front portion of the fuselage 18. The cockpit 12 is configured for accommodating one or more pilots who control the operation of the aircraft 10 by way of one or more operator controls.

Figure 2:
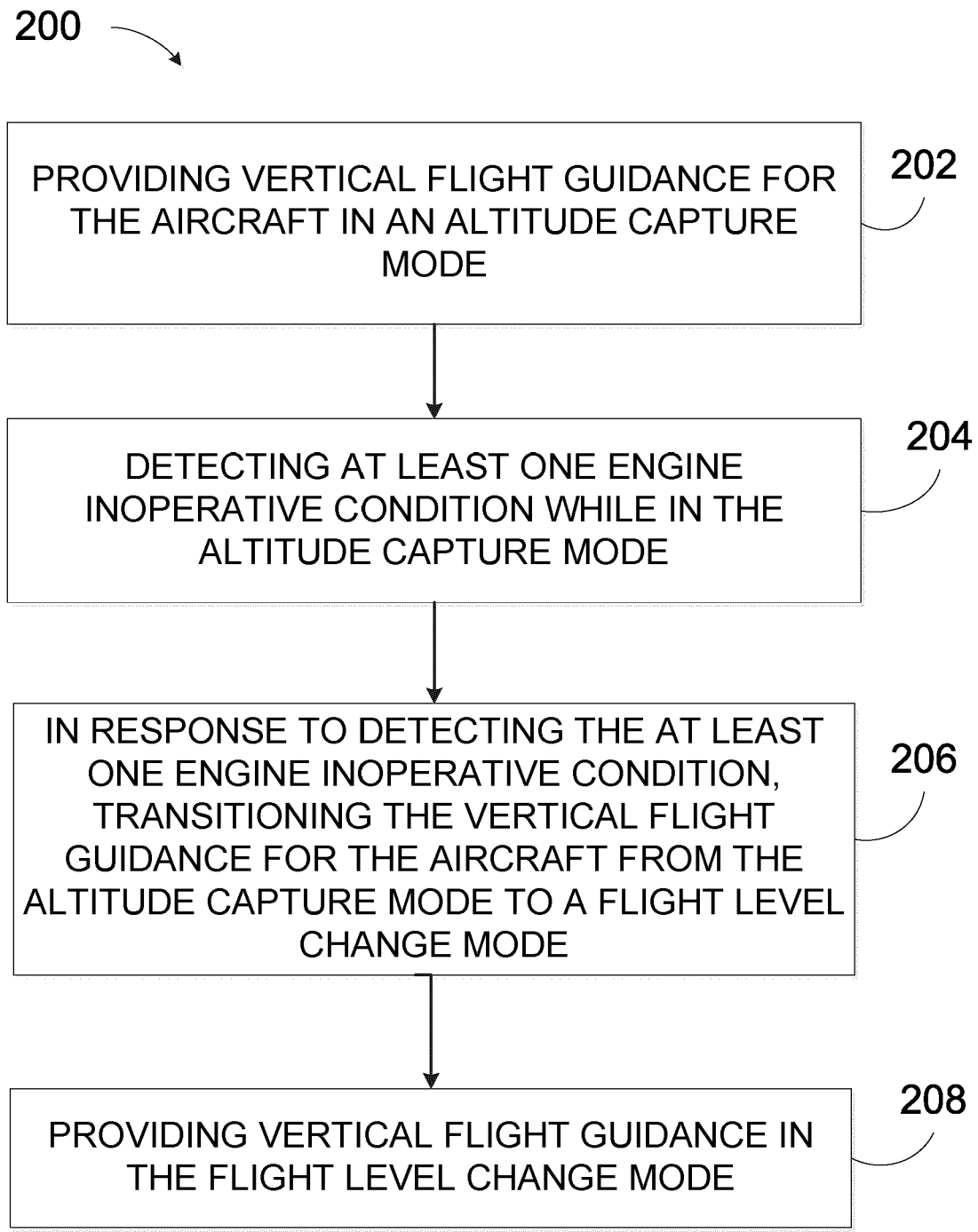
FIG. 2 is a flowchart of a method for providing vertical flight guidance for an aircraft in accordance with an embodiment.

With reference to FIG. 2, there is illustrated a flowchart of an example method 200 for providing vertical flight guidance for an aircraft, such as the aircraft 10 of FIG. 1. While the method 200 is described herein with reference to the aircraft 10, the method 200 may be applied to other types of aircraft. In accordance with an embodiment, the vertical flight guidance is provided by a flight guidance system, which may be any suitable aircraft computer, device and/or system. For example, the flight guidance system may comprise an Automatic Flight Control System (AFCS). The flight guidance system is described in further detail elsewhere in this document. The vertical flight guidance provided by method 200 may comprise providing commands to an autopilot computer for controlling the aircraft 10 and/or providing visual cues on a display device for the pilot to control the aircraft 10.

At step 202, vertical flight guidance for the aircraft 10 is provided in the ALT CAP mode for commanding the aircraft 10 to capture a target altitude. Capturing the target altitude refers to climbing/ascending the aircraft 10 to the target altitude. The target altitude may be determined by an aircraft computer or selected by the pilot. For example, after liftoff of the aircraft 10, the flight guidance system switches from a take-off mode to the altitude capture mode to ascend to the target altitude. In the altitude capture mode, airspeed of the aircraft is controlled by engine thrust control. The engine thrust control may be an automatic throttle controlled by an aircraft computer (e.g., the autothrottle computer) or a manual throttle (e.g., a throttle lever angle (TLA)) controlled by the pilot. Similarly, for example, the flight guidance may be provided in altitude capture mode to ascend the aircraft 10 to the target altitude during a go-around maneuver. In accordance with an embodiment, the altitude capture mode provides vertical flight guidance commands to the autopilot computer for automatically commanding the aircraft 10 to capture the target altitude.

At step 204, while in the altitude capture mode, at least one engine inoperative condition is detected. In accordance with an embodiment, engine operability of the aircraft 10 is monitored to detect the one engine inoperative condition. Engine operability refers to the operative or inoperative status of the engines 20 of the aircraft 10. For example, the condition when all of the engines 20 are operative may be referred to as all engines operative (AEO) and the condition when one of the engines 20 is inoperative may be referred to as one engine inoperative (OEI). The engine operability may be monitored either dynamically in real time when needed, regularly in accordance with any predetermined time interval, or irregularly. The engine operability may be actively retrieved, or may be passively received. For example, the engine operability may be retrieved and/or received from one or more measuring devices comprising one or more sensors for measuring engine operability. By way of another example, the engine operability may be retrieved and/or received from a control system or aircraft/engine computer. In some embodiments, the engine operability is obtained via existing components of the engines 20. In some embodiments, step 204 comprises triggering measurement of the engine operability whenever method 200 is initiated.

At step 206, in response to detecting the at least one OEI condition, the vertical flight guidance for the aircraft is transitioned from the altitude capture mode to a flight level change (FLC) mode. The transitions from the altitude capture mode to the FLC mode is done automatically by the flight guidance system and/or any other suitable aircraft computer without pilot intervention. By automatically transitioning from the altitude capture mode to the FLC mode and then providing flight guidance in the FLC mode, airspeed is prevented from decaying below safe operating values during take-off and/or go-around maneuvers.

At step 208, vertical flight guidance is provided in the FLC mode for commanding the aircraft 10 to capture the target altitude while maintaining airspeed of the aircraft 10 substantially at a target airspeed. In the FLC mode, airspeed of the aircraft 10 is controlled by the elevators of the aircraft 10. In particular, in the FLC mode, a pitch down command or a pitch up command may be generated to cause the elevators to change a pitch of the aircraft 10 to control airspeed of the aircraft 10. The pitch down command or the pitch up command may be generated depending on the target airspeed relative to a current airspeed of the aircraft 10. The airspeed control of the aircraft 10 in the FLC mode may be referred to as speed-on-elevator control. Speed-on-elevator control is designed to track an airspeed reference (i.e., the target airspeed). The target airspeed may be a calibrated airspeed (CAS), an indicated airspeed (IAS), a Mach number or the like. Accordingly, in the FLC mode, flight guidance commands are generated to substantially maintain the target airspeed based on controlling the elevators of the aircraft 10. Substantially maintaining the airspeed of the aircraft 10 at the target airspeed refers to controlling the airspeed of the aircraft 10 at the target airspeed within an acceptable range of deviation. For example, an acceptable range of deviation may be ±1%, ±2%, ±3% or any other suitable value. By way of another example, an acceptable range of deviation may be ±2 kts, ±3 kts, ±4 kts, ±5 kts or any other suitable value.

The target airspeed may be set as a function of operating conditions of the aircraft 10. The target airspeed may be set through an on-board Flight Management System (FMS) or manually by the crew using a Flight Control Panel (FCP). In some embodiments, the target airspeed is set depending on whether the OEI condition is detected at takeoff or at a time of a go-around maneuver. For example, if the OEI condition is detected at takeoff, the target airspeed may be set at a takeoff safety speed (V2) for the aircraft 10. V2 refers to the target climb speed to be attained at or before a height of 35 feet above the runway during a continued take-off, following an engine failure Similarly, if the OEI condition is detected at takeoff, the target airspeed may be set at the takeoff safety speed for the aircraft 10 plus a predetermined value. The predetermined value may be 10 or 20 kts or any other suitable value. The predetermined value may be selected to prevent speed decay below the takeoff safety speed. In some embodiments, if there is no engine failure (AEO) at take-off, the aircraft 10 would accelerate to a minimum of V2+10 kts; then, if OEI occurs, the target airspeed may be set at V2+10 kts. By way of another example, if the OEI condition is detected at a time of a go-around maneuver, the target airspeed may be set at a go-around speed (VGA) of the aircraft 10. Setting the target airspeed to the VGA may prevent speed decay below a missed approach climb speed (VAC). Other values for setting the target airspeed are contemplated.

In accordance with an embodiment, the transition from the altitude capture mode to the FLC mode is a transition into a second FLC mode different from a transition into a first FLC mode. For ease of readability, the first FLC mode is referred to herein as a normal flight level change (NFLC) mode and the second FLC mode is referred to herein as a forced flight level change (FFLC) mode. The FFLC mode is a vertical flight guidance mode with control parameters different from the NFLC mode. The NFLC mode corresponds to a conventional FLC mode.

In some embodiments, in the FLC mode, a vertical speed of the aircraft 10 is maintained above a minimum vertical speed level. Accordingly, providing vertical flight guidance may comprise commanding the aircraft 10 to maintain a vertical speed of the aircraft above a minimum vertical speed level. For example, in the context of the FFLC mode, the minimum vertical airspeed may be set at 100 feet/min. The minimum vertical speed may be set depending on operating conditions of the aircraft 10.

In some embodiments, in the FLC mode, a vertical acceleration of the aircraft 10 is maintained below a vertical acceleration limit Accordingly, providing vertical flight guidance may comprise commanding the aircraft 10 to limit the vertical acceleration of the aircraft below the vertical acceleration limit In accordance with an embodiment, in the context of the FFLC mode, the vertical acceleration limit is set at 0.4 G. The vertical acceleration limit may be set at other values (e.g., 0.3 G, 0.18 G, or any other suitable value), which may depend on dynamics of the aircraft 10. The 0.4 G vertical acceleration limit has been found to typically not induce passenger discomfort and provides a more aggressive pitch down to rectify the speed decay situation relative to NFLC mode which typically has a vertical acceleration limit of 0.1 G. The vertical acceleration limit may be set depending on operating conditions of the aircraft 10. Accordingly, in some embodiments, the FLC mode has a set of control parameters that may be adjusted and/or set depending on operating conditions. The control parameters may comprise the target airspeed, the minimum vertical speed level, the vertical acceleration limit and/or any other suitable control parameters used in the operation of the FLC mode.

The NFLC mode has a first set of control parameters and the FFLC mode has a second set of control parameters. In accordance with a specific and non-limiting example of implementation, the first set of control parameters for the NFLC mode comprises the minimum vertical speed level set at 250 feet/min below 20,000 feet pressure altitude and the vertical acceleration limit set at 0.1 G. In accordance with another specific and non-limiting example of implementation, the second set of control parameters for the FFLC mode comprises the minimum vertical speed level set at 100 feet/min and the vertical acceleration limit set at 0.4 G. In the above example, the FFLC mode has a higher vertical acceleration limit than the vertical acceleration limit of the NFLC mode and a lower minimum vertical speed level than the minimum vertical speed level of the NFLC mode. It should be appreciated that, in the above example, a more aggressive pitch down command is thus provided by the FFLC mode compared to the NFLC mode for the purpose of protecting the speed reference. For example, by setting the minimum vertical speed level set at 100 feet/min in the FFLC mode, the minimum vertical speed level may be set low enough to support aggressive speed control but high enough to avoid negative vertical acceleration. By way of another example, by setting the vertical acceleration limit at 0.4 G, the vertical commands are generated to aggressively nose over the aircraft to neutralize speed decay. The control parameters of the NFLC and FFLC mode may vary depending on practical implementation.

It should be appreciated that conventionally when an OEI occurs in ALT CAP mode, pilot intervention is typically required to push the nose of the aircraft down to rectify the speed decay situation. However, for example, when AFCS pilot intervention is not possible (e.g., for the reasons provided in the Background section of this document), it is desirable for the AFCS to ensure automatic airspeed protection through pitch command. While a crew member could in theory manually actuate a FLC mode pushbutton on a Flight Control Panel (FCP) to activate the NFLC mode, this has drawbacks. For example, when a low altitude capture occurs it is due of high rate of climb (i.e., light weight combined with power-full thrust). Right after an ALT CAP OEI event occurs, the rate of climb does not necessarily decrease immediately and it takes a while (e.g., 10 to 20 seconds) for the rate of climb to decrease depending of the current conditions of the aircraft. If the crew transitions to NFLC mode through pressing FLC mode button on the FCP, the flight guidance switches for an iteration to NFLC mode but then switches immediately back to ALT CAP due to the rate of climb which is still high. The crew would then have to wait an undetermined period of time until the rate of climb decreases due to the engine failure and only then press FLC button in order to have the flight guidance stay in NFLC mode and recalculate the ALT CAP point for a new (diminished) rate of climb. As such, it would be unacceptable for a pilot to manually push the FLC mode button to activate the NFLC mode. Accordingly, it is desirable for the flight guidance system to make use of the already existing FLC flight guidance vertical mode with modified control parameters designed for timely and effective airspeed protection, thus automatically transitioning the vertical guidance for the aircraft from the ALT CAP mode to the FFLC mode. Thus, the flight guidance system and/or any other suitable aircraft computer may automatically, without pilot intervention (e.g., no pilot action on the FLC pushbutton on the FCP), transition the vertical flight guidance for the aircraft from the ALT CAP mode to an already existing FLC mode with the control parameters modified.

In accordance with an embodiment, the vertical flight guidance for the aircraft 10 is transitioned from the altitude capture mode to the FFLC mode at step 206 in response to detecting the at least one engine inoperative condition when airspeed of the aircraft 10 is below an airspeed threshold. The airspeed may be the CAS, IAS, Mach number or the like. The airspeed threshold may be V2, VAC or any other suitable value. In some embodiments, while the airspeed of the aircraft 10 is below the airspeed threshold, the FFLC mode is used to provide flight guidance and then when the airspeed is above the airspeed threshold, the FFLC mode is transitioned from the FFLC mode to the NFLC mode. The airspeed threshold may be set depending on operating conditions. In some embodiments, the airspeed threshold is set at the target airspeed. The airspeed threshold may vary depending on practical implementations.

In some embodiments, the vertical flight guidance for the aircraft is transitioned from the altitude capture mode to the FFLC mode at step 206 in response to detecting the at least one engine inoperative condition when complemented deceleration of the aircraft drops below a deceleration threshold. Complemented acceleration/deceleration refers to a longitudinal acceleration/deceleration of the aircraft 10 complemented by a filtered IAS of the aircraft 10 (e.g., from an air data system probe). In some embodiments, while the complemented deceleration is below the deceleration threshold, the FFLC mode is used and then when the complemented deceleration is above the deceleration threshold, the FFLC mode is transitioned from the FFLC mode to the NFLC mode. The deceleration threshold may be set at 1.18 kts/s or any other suitable value. In accordance with an embodiment, computer simulation was used to determine that a deceleration threshold of 1.18 kts/s is high enough to avoid nuisance activation due to turbulence and low enough to detect a true deceleration as a result of the OEI condition. Accordingly, the complemented deceleration may be used to avoid an inadvertent transition to the FFLC mode due to noisy inertial deceleration below the deceleration threshold. The deceleration threshold may vary depending on practical implementations.

In some embodiments, when the airspeed of the aircraft 10 is below the airspeed threshold or when complemented deceleration of the aircraft is below the deceleration threshold, the FFLC mode is used to provide flight guidance. In some embodiments, when the airspeed is above the airspeed threshold and when complemented deceleration of the aircraft is above the deceleration threshold, the FFLC mode is transitioned from the FFLC mode to the NFLC mode.

In some embodiments, the vertical flight guidance for the aircraft is transitioned from the NFLC mode to the FFLC mode when complementary filtered airspeed of the aircraft is below a V2−3 (i.e., V2 minus 3 knots) or Vac−3 (i.e., VAC minus 3 knots) speed, aircraft altitude is below a reference altitude by a set altitude amount, and aircraft altitude is below the target altitude. Complementary filtered airspeed refers to the airspeed of the aircraft as outputted by an airspeed complementary filter. The airspeed complementary filter uses IAS of the aircraft 10 and the longitudinal acceleration of the aircraft 10 as inputs. The purpose of the airspeed complementary filter is to filter out gust components and restore high frequency components due to aircraft maneuvering. The re-activation of FFLC mode may prevent unnecessary transition to the NFLC mode when takeoff mode or go-around mode has already commenced satisfactory speed tracking of the target airspeed at V2 or VAC.

In some embodiments, when altitude of the aircraft 10 is above a capture point of the target altitude, airspeed is above the airspeed threshold, and complemented deceleration is above the deceleration threshold, the FFLC mode is deactivated. In some embodiments, when altitude of the aircraft 10 is above the target altitude minus a predetermined amount (e.g., 100 feet), the FFLC mode is deactivated. This may prevent altitude overshoot due to unnecessary FFLC mode activation, or prevent toggling between FFLC mode and ALT CAP mode. Unnecessary FFLC activation may in turn be avoided and selection of other vertical modes allowed, thereby preventing latent activation after takeoff or go-around phase is complete.

Figure 3:
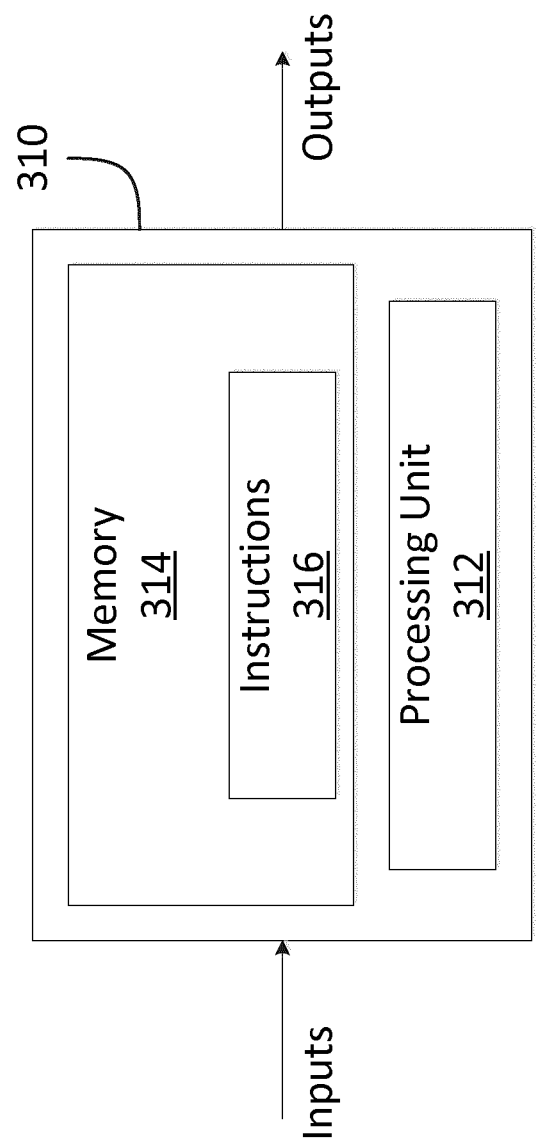
FIG. 3 is a block diagram of an example computing device.

With reference to FIG. 3, the method 200 may be implemented by a computing device 310. The computing device 310 comprises a processing unit 312 and a memory 314 which has stored therein computer-executable instructions 316. The processing unit 312 may comprise any suitable devices configured to implement the method 200 such that instructions 316, when executed by the computing device 310 or other programmable apparatus, may cause the functions/acts/steps performed as part of the method 200 as described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 314 may comprise any storage means (e.g., devices) suitable for retrievably storing machine-readable instructions 316 executable by processing unit 312.

The methods and systems for providing flight guidance described herein may be implemented in a high level procedural or object oriented programming or scripting language, or a combination thereof, to communicate with or assist in the operation of a computer system, for example the computing device 310. Alternatively, the methods and systems for providing flight guidance may be implemented in assembly or machine language. The language may be a compiled or interpreted language. Program code for implementing the methods and systems for providing flight guidance may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for providing flight guidance may also be considered to be implemented by way of a non-transitory computer-readable storage medium having a computer program stored thereon. The computer program may comprise computer-readable instructions which cause a computer, or more specifically the processing unit 312 of the computing device 310, to operate in a specific and predefined manner to perform the functions described herein, for example those described in the method 200. Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 4:
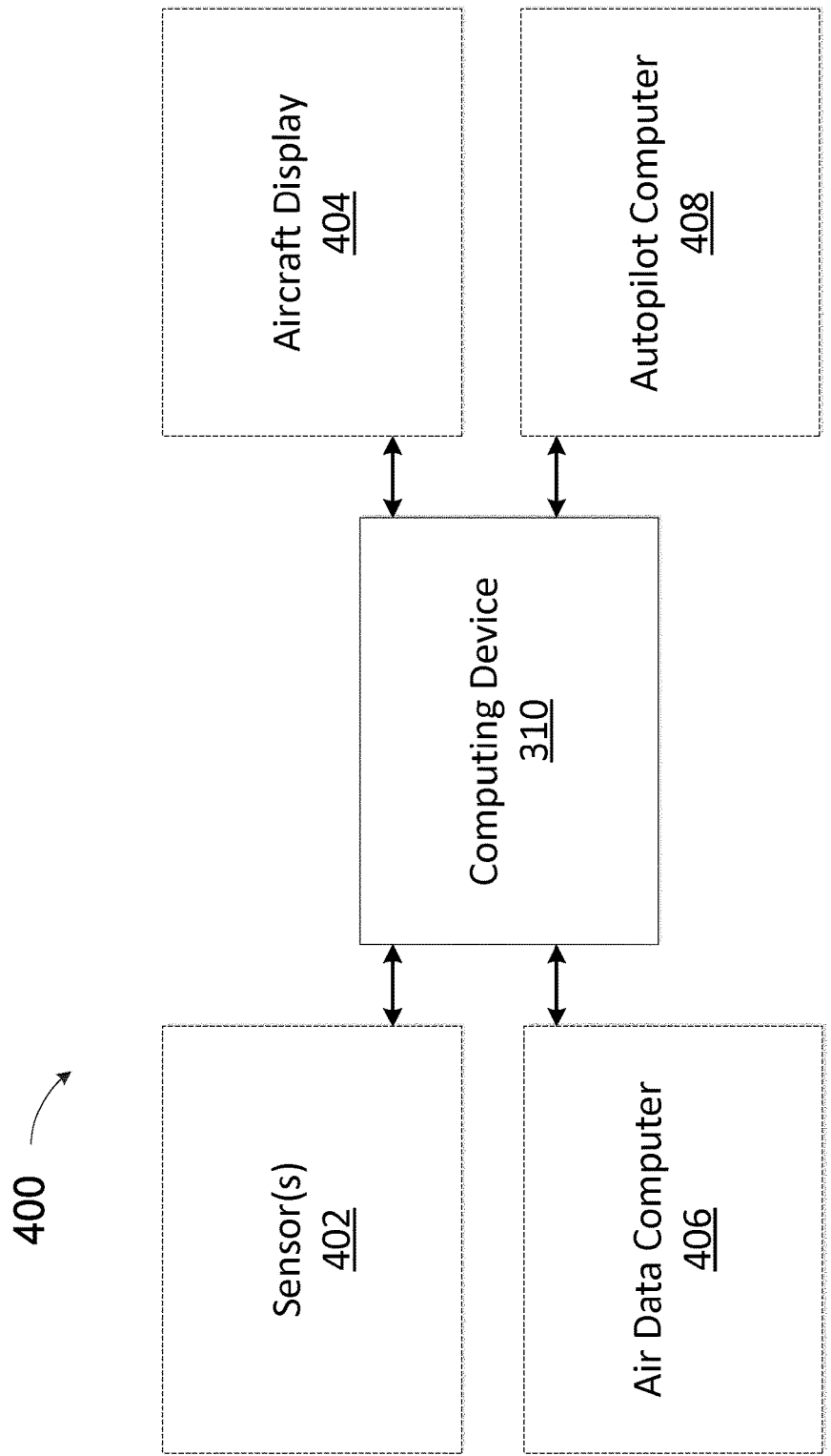
FIG. 4 is a block diagram of an example flight guidance system comprising the computing device of FIG. 3.

With reference to FIG. 4, the method 200 may be implemented by a flight guidance system 400 comprising the computing device 310. In some embodiments, the system 400 is connected (e.g., over one or more buses) to and/or comprises one or more sensors 402, an aircraft display 404, an air data computer 406, and/or an autopilot computer 408. In accordance with an embodiment, the computing device 310 processes inputs from the one or more sensors 402 and/or the air data computer 406 to determine flight guidance commands. The computing device 310 then provides the flight guidance commands to the aircraft display 404 and/or the autopilot computer 408. In some embodiments, the computing device 310 implements the autopilot functionality of the autopilot computer 408. Accordingly, the flight guidance system 400 may be referred to as an automatic flight control system (AFCS), a flight guidance control system (FGCS), and/or by any other suitable nomenclature.

The aircraft display 404 may comprise any kind of display such as an LCD (liquid crystal display), an LED (light emitting diode) display, a CRT (cathode ray tube) display, a HUD (Heads-up Display), a PFD (primary flight display), and/or any other suitable display device. A HUD is any transparent display that presents data in the pilot or co-pilot's field of vision without obstructing the view. A PFD is an aircraft instrument dedicated to flight information. The aircraft display 404 may display the vertical flight guidance for the aircraft as calculated by the computing device 310. Accordingly, the computing device 310 may cause a graphical user interface (GUI) to display the vertical flight guidance commands for the aircraft 10 on the aircraft display 400. In some embodiments, the aircraft display 404 is separate from the system 400 and/or may be an existing part of the aircraft 10. The aircraft display 404 may be operably coupled to the computing device 310 by one or more data buses such that the computing device 310 may provide the vertical flight guidance and/or other suitable parameters to the aircraft display 400.

In some embodiments, the flight guidance system 400 sets an ALT CAP signal to TRUE when the altitude capture mode is activated (e.g., step 202 of FIG. 2) and to FALSE when the altitude capture mode is deactivated (e.g., step 206 of FIG. 2). In some embodiments, the flight guidance system 400 receives and/or generates an OEI signal indicative of the OEI condition when one engine is inoperative (e.g., step 204 of FIG. 2). For example, the OEI signal may be set to TRUE when one engine is inoperative and to FALSE when all engines are operative. In some embodiments, the flight guidance system 400 detects when both the OEI signal is TRUE and the ALT CAP signal is TRUE (e.g., step 206 of FIG. 2), and then sets an FLC signal to TRUE. In some embodiments, when the FLC signal is set to TRUE, the flight guidance system 400 provides flight guidance according to the FLC mode (e.g., step 208 of FIG. 2). In some embodiments, the flight guidance system 400 determines that the conditions for activating the FFLC mode are present (e.g., when airspeed of the aircraft 10 is below the airspeed threshold or when complemented deceleration of the aircraft is below the deceleration threshold), and then sets FFLC signal to TRUE. Otherwise, if it is determined that the conditions for activating the FFLC mode are not present, the FFLC signal is set to FALSE. In some embodiments, when the FFLC signal is TRUE, the FLC mode operates according to the control parameters for FFLC; otherwise, when the FFLC signal is FALSE and the FLC signal is TRUE, the FLC mode operates according to the control parameters for NFLC. In some embodiments, the flight guidance system 400 determines that the conditions for deactivating the FFLC mode are present (e.g., when airspeed of the aircraft 10 is above the airspeed threshold and/or when complemented deceleration of the aircraft is above the deceleration threshold), and then sets the FFLC signal to FALSE. Accordingly, the FFLC mode is activated when FFLC signal is TRUE and deactivated when the FFLC signal is FALSE.

In some embodiments, the FFLC mode has a state. The state may be active, reset, re-activation, or disabled. For example, when the FFLC mode is activated, the FFLC state may be set to active. When the FFLC mode transitions to the NFLC mode, the FFLC state may be set to reset. When the NFLC mode transitions back to the FFLC mode, the FFLC state may be set to re-activation. When operating in the altitude capture mode, the FFLC state may be set to disabled.

The operating conditions of the aircraft 10 used for setting, updating, and adjusting the various parameters described herein may comprise one or more of a state of the aircraft 10 (e.g., takeoff, go-around maneuver, landing and the like), airspeed (e.g., CAS, IAS, Mach and the like), altitude, engine operability (e.g., AEO, OEI and the like), vertical speed, vertical acceleration rate and/or any other suitable operating conditions.

In some embodiments, both the FFLC mode and the NFLC mode are displayed as FLC on a flight mode annunciation (FMA) vertical mode field of the flight guidance system.

In some embodiments, when the FFLC mode is active, all other vertical modes are disabled except for underspeed protection (USPD) mode and windshear (WSHR) mode. The USPD mode may be on Flight Guidance (FG) or on Autothrottle (A/T). In this example, reference is made to the FG USPD mode, when speed decreases below a limit called Vmintrim, the FG USPD mode activates to pitch the aircraft 10 down. With FFLC protecting against V2 in takeoff which is typically higher than Vmintrim; however, in the unlikely case that FFLC is unable to protect the airspeed decay and the airspeed of the aircraft 10 reaches the Vmintrim threshold, in this example, the USPD mode is activated to take priority over FFLC.

Computer simulation, modeling, engineering simulators and/or processing may be used to determine the various parameters described herein. For example, computer simulation, modeling, engineering simulators and/or processing may be used to determine the predetermined value, the control parameters, the target airspeed, the minimum vertical speed level, the vertical acceleration limit, etc. In some embodiments, computer simulations, modeling, engineering simulators and/or processing are performed to determine the control parameters for the FFLC mode and/or the NFLC mode. For example, the control parameters for the FFLC mode may be determined from computer simulations, modeling, engineering simulators and/or processing such that the control parameters prevent negative vertical rates and/or to manage altitude overshoot (e.g., by +150 feet).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for providing flight guidance for an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method for providing vertical flight guidance for an aircraft, the method comprising:
providing, by a computer, vertical flight guidance for the aircraft in an altitude capture mode for commanding the aircraft to capture a target altitude;
detecting, by the computer, at least one engine inoperative condition while in the altitude capture mode;
in response to detecting the at least one engine inoperative condition, the computer transitioning the vertical flight guidance for the aircraft from the altitude capture mode to a flight level change mode and providing vertical flight guidance in the flight level change mode for commanding the aircraft to capture the target altitude while maintaining airspeed of the aircraft substantially at a target airspeed,
wherein detecting the at least one engine inoperative condition comprises detecting the at least one engine inoperative condition when airspeed of the aircraft is below an airspeed threshold,
wherein the flight level change mode is a second flight level change mode having a higher vertical acceleration limit than a vertical acceleration limit of a first flight level change mode and a lower minimum vertical speed level than a minimum vertical speed level of the first flight level change mode; and
wherein the method further comprises transitioning, by the computer, the second flight level change mode to the first flight level change mode when airspeed is above the airspeed threshold.

2. The method of claim 1, wherein detecting the at least one engine inoperative condition comprises detecting the at least one engine inoperative condition at takeoff.

3. The method of claim 1, wherein the target airspeed is a takeoff safety speed of the aircraft.

4. The method of claim 1, wherein the target airspeed is a takeoff safety speed of the aircraft plus a predetermined value.

5. The method of claim 1, wherein detecting the at least one engine inoperative condition comprises detecting the at least one engine inoperative condition at a time of a go-around maneuver.

6. The method of claim 1, wherein the airspeed threshold is a takeoff safety speed of the aircraft.

7. The method of claim 1, further comprising transitioning, by the computer, the first flight level change mode to the second flight level change mode when complementary filtered airspeed of the aircraft is below a takeoff safety speed minus 3 knots, aircraft altitude is below a reference altitude by a set altitude amount, and aircraft altitude is below the target altitude.

8. The method of claim 1, further comprising transitioning, by the computer, the first flight level change mode to the second flight level change mode when complementary filtered airspeed of the aircraft is below a missed approach climb speed minus 3 knots, aircraft altitude is below a reference altitude by a set altitude amount, and aircraft altitude is below the target altitude.

9. The method of claim 1, wherein providing vertical flight guidance in the flight level change mode comprises maintaining airspeed of the aircraft substantially at a go-around speed of the aircraft with one engine inoperative.

10. The method of claim 1, wherein detecting the at least one engine inoperative condition comprises detecting the at least one engine inoperative condition when complemented deceleration of the aircraft drops below a deceleration threshold.

11. The method of claim 1, wherein providing vertical flight guidance comprises providing commands to an autopilot computer for controlling the aircraft.

12. A system for providing vertical flight guidance for an aircraft, the system comprising:
a processing unit; and a non-transitpry computer-readable memory having stored thereon program instructions executable by the processing unit for:
  providing vertiacal flight guidance for the aircraft in an altitude capture mode for commanding the aircraft to capture a target altitude;
  detecting at least one engine inoperative condition while in the altitude capture mode;
  in response to detecting the at least one engine inoperative condition, transitioning the vertical flight guidance for the aircraft from the altitude capture mode to a flight level change mode and providing vertical flight guidance in the flight level change mode for commanding the aircraft to capture the target altitude while maintaining airspeed of the aircraft substantially at a target airspeed,
  wherein detecting the at least one engine inoperative condition comprises detecting the at least one engine inoperative condition when airspeed of the aircraft is below an airspeed threshold, and
  wherein the flight level change mode is a second flight level change mode having a higher vertical acceleration limit than a vertical acceleration limit of a first flight level change mode and a lower minimum vertical speed level than a minimum vertical speed level of the first flight level change mode; and wherein the program instructions are further executable by the processing unit for transitioning the second flight level change mode to the first flight level change mode when airspeed is above the airspeed threshold.

13. The system of claim 12, wherein detecting the at least one engine inoperative condition comprises detecting the at least one engine inoperative condition at takeoff.

14. The system of claim 12, wherein the target airspeed is a takeoff safety speed of the aircraft.

15. The system of claim 12, wherein the target airspeed is a takeoff safety speed of the aircraft plus a predetermined value.

16. The system of claim 12, wherein detecting the at least one engine inoperative condition comprises detecting the at least one engine inoperative condition at a time of a go-around maneuver.

17. The system of claim 12,
  wherein detecting the at least one engine inoperative condition comprises detecting the at least one engine inoperative condition when airspeed of the aircraft is below an airspeed threshold, and
  wherein the airspeed threshold is a takeoff safety speed of the aircraft.

18. The system of claim 12, wherein the program instructions are further executable by the processing unit for transitioning the first flight level change mode to the second flight level change mode when complementary filtered airspeed of the aircraft is below a takeoff safety speed minus 3 knots, aircraft altitude is below a reference altitude by a set altitude amount, and aircraft altitude is below the target altitude.

19. The system of claim 12, wherein the program instructions are further executable by the processing unit for transitioning the first flight level change mode to the second flight level change mode when complementary filtered airspeed of the aircraft is below a missed approach climb speed minus 3 knots, aircraft altitude is below a reference altitude by a set altitude amount, and aircraft altitude is below the target altitude.

20. A system for providing vertical flight guidance for an aircraft, the system comprising:
  a processing unit; and
  a non-transitpry computer-readable memory having stored thereon program instructions executable by the processing unit for:
    providing vertiacal flight guidance for the aircraft in an altitude capture mode for commanding the aircraft to capture a target altitude;
    detecting at least one engine inoperative condition while in the altitude capture mode;
  in response to detecting the at least one engine inoperative condition, transitioning the vertical flight guidance for the aircraft from the altitude capture mode to a flight level change mode and providing vertical flight guidance in the flight level change mode for commanding the aircraft to capture the target altitude while maintaining airspeed of the aircraft substantially at a target airspeed,
  wherein detecting the at least one engine inoperative condition comprises detecting the at least one engine inoperative condition when complemented deceleration of the aircraft drops below a deceleration threshold,
  wherein the flight level change mode is a second flight level change mode having a higher vertical acceleration limit than a vertical acceleration limit of a first flight level change mode and a lower minimum vertical speed level than a minimum vertical speed level of the first flight level change mode; and
  wherein the program instructions are further executable by the processing unit for transitioning the second flight level change mode to the first flight level change mode when complemented deceleration is above the deceleration threshold.

* * * * *